United States Patent
Decuzzi (10) Patent No.: US 11,813,956 B1
(45) Date of Patent: Nov. 14, 2023

(54) APPARATUS FOR REMOVING AND INSTALLING A BATTERY FOR AN ELECTRICALLY DRIVEN VEHICLE AND RELATED METHOD

(71) Applicant: Louis Decuzzi, Brunswick, OH (US)

(72) Inventor: Louis Decuzzi, Brunswick, OH (US)

(73) Assignee: Louis DeCuzzi, Brunswick, OH (US)

( * ) Notice: Subject to any disclaimer, the term of this patent is extended or adjusted under 35 U.S.C. 154(b) by 609 days.

(21) Appl. No.: 17/084,750

(22) Filed: Oct. 30, 2020

Related U.S. Application Data (60) Provisional application No. 62/927,979, filed on Oct. 30, 2019.

(51) Int. Cl.
*B66D 1/60* (2006.01)
*B60L 53/80* (2019.01)
*B66C 1/22* (2006.01)

(52) U.S. Cl.
CPC ............ *B60L 53/80* (2019.02); *B66C 1/223* (2013.01); *B66D 1/60* (2013.01); *B66D 2700/0141* (2013.01)

(58) Field of Classification Search
CPC .......... B60L 53/80; B66C 1/223; B66D 1/60; B66D 2700/0141; B60K 2001/0455; B60K 1/04
USPC ........................................................ 180/68.5
See application file for complete search history.

(56) References Cited

U.S. PATENT DOCUMENTS

| | | | | |
|---|---|---|---|---|
| 5,301,765 | A  * | 4/1994 | Swanson | B60K 1/04 180/68.5 |
| 7,712,563 | B2 * | 5/2010 | Niebuhr | B60L 53/80 180/311 |
| 9,358,895 | B2 * | 6/2016 | Avganim | B60K 1/04 |
| 9,561,735 | B2 * | 2/2017 | Nozaki | B60K 1/04 |
| 10,953,555 | B2 * | 3/2021 | Altman | H02J 7/0045 |
| 2008/0006459 | A1 * | 1/2008 | Niebuhr | B66F 9/0754 180/68.5 |
| 2010/0136425 | A1 * | 6/2010 | Gau | B60L 50/64 429/187 |
| 2015/0114736 | A1 * | 4/2015 | Avganim | B60K 1/04 180/68.5 |
| 2015/0291056 | A1 * | 10/2015 | Nozaki | B60K 1/04 180/65.1 |
| 2018/0104829 | A1 * | 4/2018 | Altman | H01M 50/271 |

(Continued)

*Primary Examiner* — James A Shriver, II
*Assistant Examiner* — Hilary L Johns
(74) *Attorney, Agent, or Firm* — Edwin A. Sisson, Attorney at Law, LLC; Jeffrey J. Banyas (57) ABSTRACT

It is described herein an apparatus for removing and installing a battery for an electrically driven vehicle, and a related method for removing and installing a battery into an electrically driven vehicle. The apparatus may comprise a guide system, a battery containment structure, and a linear motion device. The guide system may comprise a first track and a second track. The battery containment structure may comprise a first plurality of bearings and a second plurality of bearings, and may be configured to receive and hold the battery. When the battery containment structure is acted upon by a linear force applied by the linear motion device to lower and raise the battery containment structure, the first plurality of bearings moves linearly along the first track while the second plurality of bearings moves linearly along the second track,

20 Claims, 8 Drawing Sheets

(56) References Cited

U.S. PATENT DOCUMENTS

| | | | |
|---|---|---|---|
| 2021/0170852 A1* | 6/2021 | Fan | A01D 34/78 |
| 2021/0206006 A1* | 7/2021 | Altman | B25J 19/005 |

* cited by examiner

APPARATUS FOR REMOVING AND INSTALLING A BATTERY FOR AN ELECTRICALLY DRIVEN VEHICLE AND RELATED METHOD

CROSS REFERENCES AND PRIORITIES

This Application claims priority from United States Provisional Application No. 62/927,979 filed on 30 Oct. 2019, the teachings of which are incorporated by reference herein in their entirety.

BACKGROUND

With the proliferation of electrically driven vehicles comes many challenges. One of these challenges is maintaining and replenishing battery charge for the electrically driven vehicle. Modern battery technology can only provide the necessary power to the electrically driven vehicle's drivetrain for so long before it requires recharging.

The simplest method for maintaining and replenishing battery charge involves electrically connecting the battery to a recharging station while the electrically driven vehicle is not in use and the battery is still installed in the electrically driven vehicle. Typically, the recharging station is hard wired to an existing electrical grid. The connection between the battery and the recharging station may be a 110V connection, but 220V connections are preferred in many applications.

In practice, this method works well when the electrically driven vehicle is not going to be in use for an extended period of time needed for partial or full recharging. However, when the electrically driven vehicle's battery charge is at or near its fully depleted state, and the operator has an immediate need to use the electrically driven vehicle, this method may present problems. The operator may not be in a position to wait an extended period of time for the recharging station to provide sufficient recharging to the battery.

In this scenario, it may be desirable for the operator to simply replace the depleted battery with a new battery which is partially or fully charged. However, batteries for modern electrically driven vehicles are often large and heavy, making the process of removing the depleted battery and replacing it with a new battery which is partially or fully charged a time and labor intensive task.

The need exists, therefor, for an improved apparatus and method for removing and installing a battery in an electrically driven vehicle.

SUMMARY

Disclosed herein is an apparatus for removing and installing a battery for an electrically driven vehicle. The apparatus may comprise a guide system, a battery containment structure, and a linear motion device.

The guide system may comprise a first track and a second track. The first track may be attached to a first location on a chassis of the electrically driven vehicle, and may have a first track length and a first track width. Similarly, the second track may be attached to a second location on the chassis of the electrically driven vehicle, and may have a second track length and a second track width. Each of the first track length and the second track length may be oriented substantially perpendicular to a force of gravity.

The battery containment structure may comprise a first side, a second side, a lower cross member, an upper cross member, a plurality of first bearings, and a plurality of second bearings. The first side may have a first side outer surface, a first side inner surface opposite the first side outer surface, and a first lip extending from the first side inner surface along at least a portion of a first side bottom edge. Similarly, the second side may have a second side outer surface, a second side inner surface opposite the second side outer surface, and a second lip extending from the second side inner surface along at least a portion of a second side bottom edge.

The lower cross-member may extend between the first side inner surface at a first side lower corner and a second side inner surface at a second side lower corner. The upper cross-member may extend between the first side inner surface along a first side top edge and the second side inner surface along a second side top edge.

The plurality of first bearings may be connected to the first side outer surface. The plurality of first bearings may be arranged in at least a first column along the first side outer surface. Each of the first bearings may have a first bearing diameter. The first bearing diameter may be substantially similar to the first track width. The plurality of first bearings may be disposed within the first track.

The plurality of second bearings may be connected to the second side outer surface. A first subset of the plurality of second bearings may be arranged in at least a second column along the second side outer surface. A second subset of the plurality of second bearings may be arranged in at least a third column along the second side outer surface. The plurality of second bearings may be disposed within the second track.

The linear motion device may be attached to a third location on the chassis of the electrically driven vehicle. The linear motion device may have a linear motion distance. The linear motion device may be connected to the upper cross-member.

The battery containment structure may be configured to receive and hold the battery between the first side inner surface and the second side inner surface. The first track length, the second track length, and the linear motion distance may be substantially equal to one another.

In some embodiments, the plurality of first bearings may comprise a first top bearing and a first bottom bearing. The first top bearing may be connected to the first side outer surface along the first side top edge. The first bottom bearing may be connected to the first side outer surface along the first side bottom edge. In certain embodiments, the plurality of first bearings may further comprise at least one first central bearing connected to the first side outer surface between the first top bearing and the first bottom bearing.

In some embodiments, the plurality of second bearings may comprise two second top bearings and two second bottom bearings. The two second top bearings may be connected to the second side outer surface along the second side top edge. The two second bottom bearings may be connected to the second side outer surface along the second side bottom edge. In certain embodiments, the plurality of second bearings may further comprise at least two second central bearings. At least one of the two second central bearings may be connected to the second side outer surface between a first of the two second top bearings and a first of the two second bottom bearings. At least one of the two second central bearings may be connected to the second side outer surface between a second of the two second top bearings and a second of the two second bottom bearings.

The linear motion device may be selected from the group consisting of a winch, a hydraulic actuator, a pneumatic actuator, an electric actuator, a gear and chain drive, a belt and pulley drive, and a screw drive. The linear motion device may be activated by a power source. In some embodiments, the power source may be the battery. In other embodiments, the power source may be a secondary power source.

In some embodiments, the apparatus may further comprise the battery. In certain embodiments, the battery may be contained within a housing. In some such embodiments, the housing may comprise a plurality of devices connected to a bottom surface of the housing. The plurality of devices may be selected from the group consisting of at least one wheel, at least one caster, and combinations thereof.

In some embodiments, the electrically driven vehicle is an all-terrain vehicle (ATV).

Also disclosed herein is a method of installing a battery into an electrically driven vehicle using the apparatus described herein. The method may comprise the steps of: a) inserting the battery into the battery containment structure, and b) applying a first linear force to the battery containment structure using the linear motion device to lift the battery containment structure into the vehicle chassis. During the step of applying the linear force to the battery containment structure, the plurality of first bearings may move linearly along the first track while the plurality of second bearings may move linearly along the second track.

In some embodiments, the method may further comprise the step of: c) electrically connecting the battery to the electrically driven vehicle's control system. Step c may occur prior to step a, after step a but before step b, or after step b.

In certain embodiments, prior to the step of inserting the battery into the battery containment structure, the battery containment structure may contain a partially or fully discharged battery electrically connected to the electrically driven vehicle's control system. In such embodiments, the method may further comprise the steps of: d) applying a second linear force to the battery containment structure containing the partially or fully discharged battery using the linear motion device to lower the battery containment structure from the vehicle chassis to the ground, e) disconnecting the partially or fully discharged battery from the electrically driven vehicle's control system, and f) removing the partially or fully discharged battery from the battery containment structure.

Steps d, e, and f may occur prior to step a. Step e may occur prior to step d, after step d but before step f, or after step d.

Also disclosed herein is an apparatus for removing and installing a battery for an electrically driven vehicle. The apparatus may comprise a guide system, a battery containment structure, and a linear motion device.

The guide system may comprise a first track and a second track. The first track may be attached to a first location on a chassis of the electrically driven vehicle, and may have a first track length and a first track width. Similarly, the second track may be attached to a second location on the chassis of the electrically driven vehicle, and may have a second track length and a second track width. Each of the first track length and the second track length may be oriented substantially perpendicular to a force of gravity.

The battery containment structure may comprise a first side, a second side, a lower cross member, an upper cross member, at least one first plate, and at least one second slide plate. The first side may have a first side outer surface, a first side inner surface opposite the first side outer surface, and a first lip extending from the first side inner surface along at least a portion of a first side bottom edge. Similarly, the second side may have a second side outer surface, a second side inner surface opposite the second side outer surface, and a second lip extending from the second side inner surface along at least a portion of a second side bottom edge.

The lower cross-member may extend between the first side inner surface at a first side lower corner and a second side inner surface at a second side lower corner. The upper cross-member may extend between the first side inner surface along a first side top edge and the second side inner surface along a second side top edge.

The at least one first slide plate may be connected to the first side outer surface. The at least one first slide plate may be sized and shaped to fit within the first track. The at least one second slide plate may be connected to the second side outer surface. The at least one second slide plate may be sized and shaped to fit within the second track. Each of the at least one first slide plate and the at least one second slide plate may independently comprise a low friction material selected from the group consisting of ultra high molecular weight polyethylene (UHMW) plastics, bronze, powdered metal, and Teflon®.

The linear motion device may be attached to a third location on the chassis of the electrically driven vehicle. The linear motion device may have a linear motion distance. The linear motion device may be connected to the upper cross-member.

The battery containment structure may be configured to receive and hold the battery between the first side inner surface and the second side inner surface. The first track length, the second track length, and the linear motion distance may be substantially equal to one another.

The linear motion device may be selected from the group consisting of a winch, a hydraulic actuator, a pneumatic actuator, an electric actuator, a gear and chain drive, a belt and pulley drive, and a screw drive. The linear motion device may be activated by a power source. In some embodiments, the power source may be the battery.

In certain embodiments, the battery may be contained within a housing. In some such embodiments, the housing may comprise a plurality of devices connected to a bottom surface of the housing. The plurality of devices may be selected from the group consisting of at least one wheel, at least one caster, and combinations thereof.

DETAILED DESCRIPTION

Disclosed herein is an apparatus for removing and installing a battery for an electrically driven vehicle. The apparatus is described below with reference to the FIGURES. As described herein and in the claims, the following numbers refer to the following structures as noted in the FIGURES.
  10 refers to an apparatus.
  20 refers to a battery.
  22 refers to a housing.
  24 refers to a wheel or caster.
  30 refers to an electrically driven vehicle.
  40 refers to a chassis.
  41 refers to a first location (on the chassis).
  42 refers to a second location (on the chassis).
  43 refers to a third location (on the chassis).
  100 refers to a guide system.
  110 refers to a first track.
  112 refers to a first track length.
  114 refers to a first track width.
  120 refers to a second track.
  122 refers to a second track length.
  124 refers to a second track width.
  200 refers to a battery containment structure.
  210 refers to a first side (of the battery containment structure).
  211 refers to a first side outer surface.
  212 refers to a first side inner surface.
  213 refers to a first side bottom edge.
  214 refers to a first side top edge.
  215 refers to a first side lower corner.
  216 refers to a first lip.
  220 refers to a second side (of the battery containment structure).
  221 refers to a second side outer surface.
  222 refers to a second side inner surface.
  223 refers to a second side bottom edge.
  224 refers to a second side top edge.
  225 refers to a second side lower corner.
  226 refers to a second lip.
  230 refers to a lower cross-member (of the battery containment structure).
  240 refers to an upper cross-member (of the battery containment structure).
  250 refers to a first bearing.
  252 refers to a first bearing diameter.
  260 refers to a second bearing.
  262 refers to a second bearing diameter.
  264 refers to a gap distance.
  266 refers to a bearing span.
  300 refers to a linear motion device.

Figure 1:
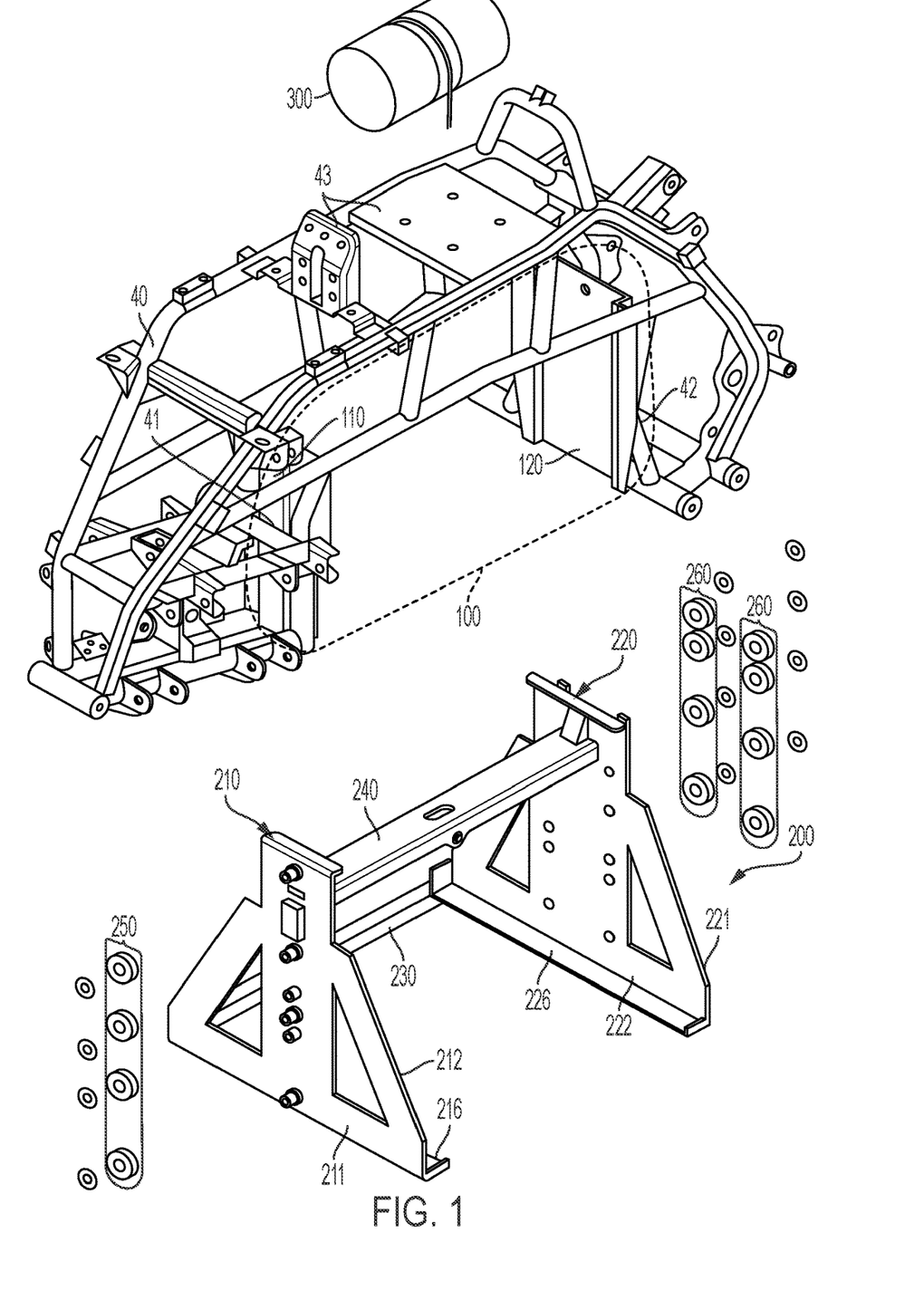
FIG. 1 depicts a perspective exploded view of an apparatus for removing and installing a battery in an electrically driven vehicle.
Figure 2:
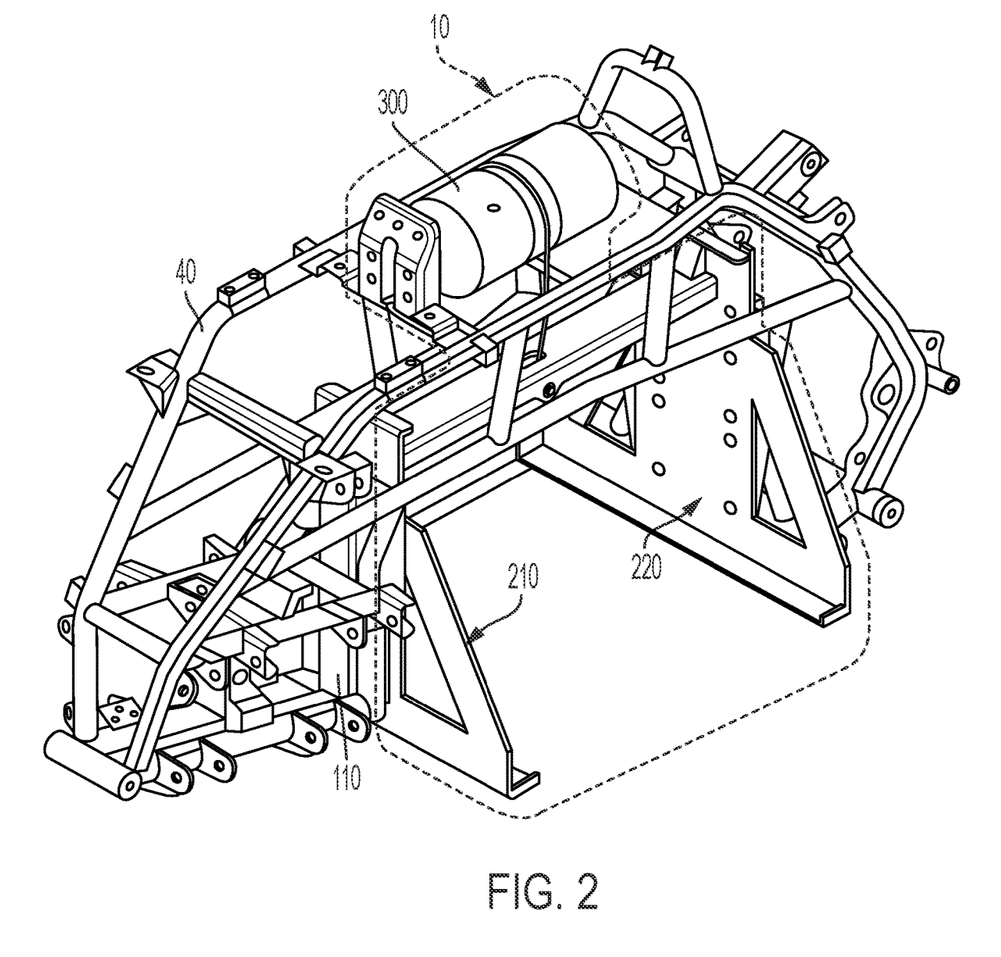
FIG. 2 depicts a perspective assembled view of the apparatus shown in FIG. 1.
Figure 5:
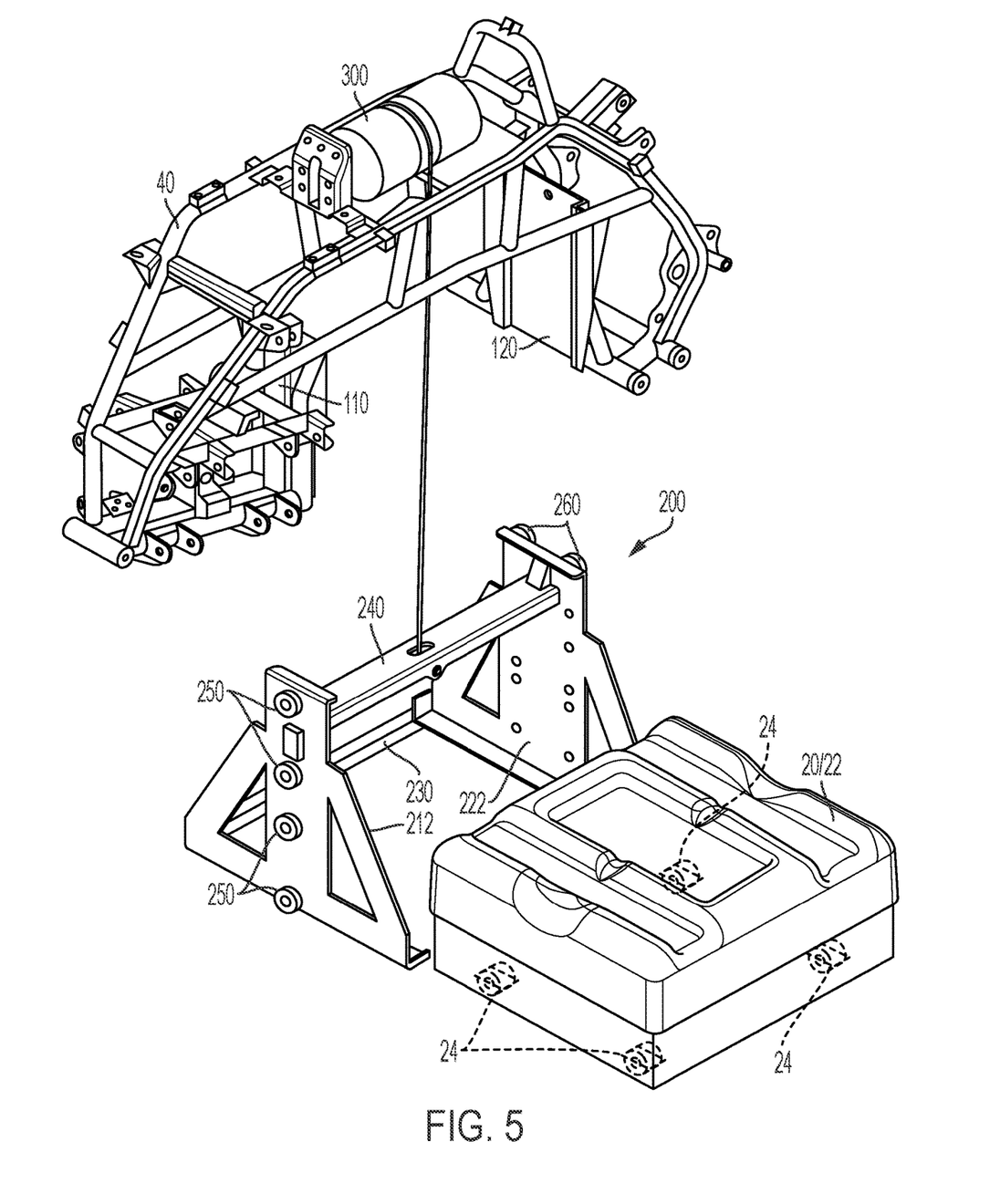
FIG. 5 depicts a perspective view of a chassis for an electrically driven vehicle with an apparatus for removing and installing a battery in the electrically driven vehicle.
Figure 6:
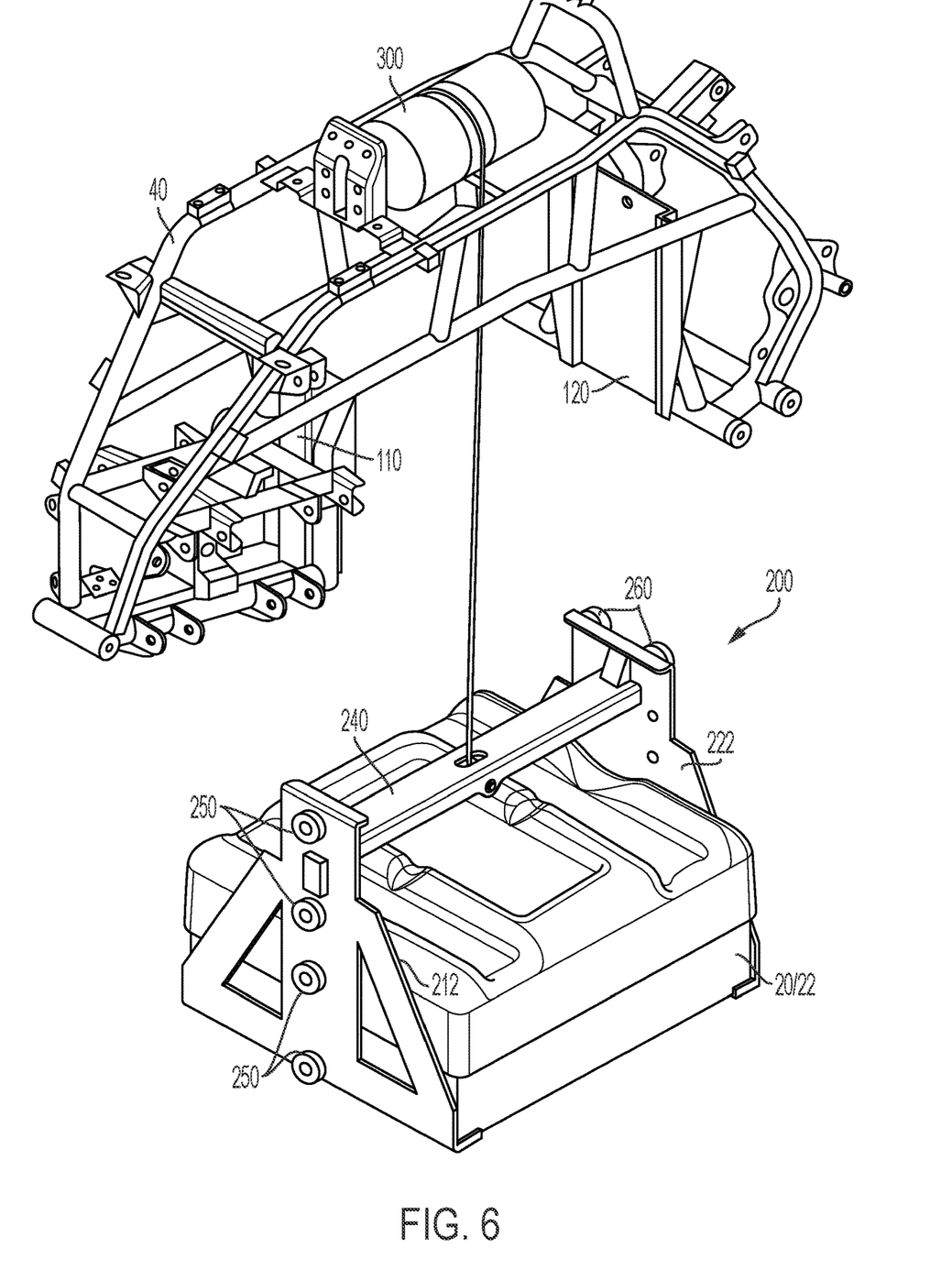
FIG. 6 depicts an assembled view of the chassis and apparatus as shown in FIG. 5 with a battery installed in the apparatus.
Figure 7:
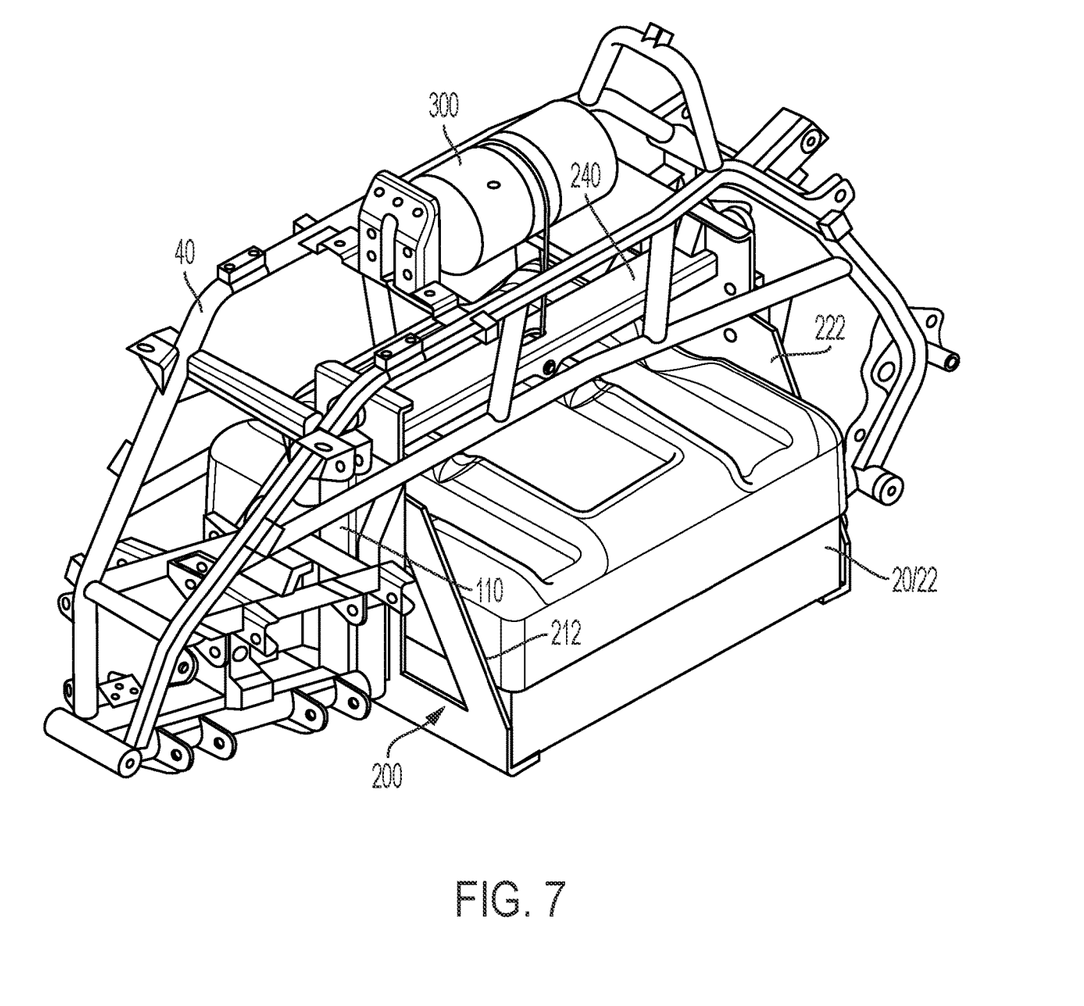
FIG. 7 depicts an assembled view of the chassis and apparatus as shown in FIGS. 5 and 6 with the battery lifted into the chassis.

FIG. 1 to FIG. 2 depicts an exploded perspective view of one embodiment of the apparatus (10) for removing and installing a battery (20 as shown in FIG. 5 to FIG. 7) for an electrically driven vehicle. As shown, the electrically driven vehicle comprises a chassis (40). The chassis may be in many forms including a ladder frame chassis, a unibody chassis, a backbone tube chassis, an X-frame chassis, a perimeter frame chassis, a platform frame chassis, a space frame chassis, and a subframe chassis.

As shown, the apparatus (10) includes a guide system (100). The guide system may comprise at least two tracks—referred to herein as a first track (110) and a second track (120). The first track may be attached to a first location (41) on the chassis (40) while the second track may be attached to a second location (42) on the chassis.

The attachment between the first track (110) and the chassis (40), and the second track (120) and the chassis may take many forms. In some embodiments the attachment may comprise an integral attachment such as welding the respective track to the chassis or manufacturing the chassis and the respective track from a single integral piece of material. In other embodiments, the attachment may comprise a fastened attachment in which a third component such as one or more bolts (with or without a nut), one or more screws, one or more rivets, and combinations thereof attach the respective track to the chassis.

Each of the first track length and the second track length may be oriented substantially perpendicular to or perpendicular to a force of gravity. In other words the length dimension of each track extends towards and away from the ground while the width dimension of each track extends substantially parallel to or parallel to the ground.

FIG. 1 to FIG. 2 also depicts a battery containment structure (200). Although the battery containment structure may take many configurations, the preferred configuration is shown. The configuration in FIG. 1 to FIG. 2 comprises a first side (210), a second side (220), a lower cross-member (230), an upper cross-member (240), a plurality of first bearings (250), and a plurality of second bearings (260).

As shown in FIG. 1 to FIG. 2, the first side (210) of the battery containment structure (200) may have a first side outer surface (211) and a first side inner surface (212) opposite the first side outer surface. The first side may also have a lip (216) extending from the first side inner surface along at least a portion of a first side bottom edge (213).

Similarly, as also shown in FIG. 1 to FIG. 2, the second side (220) of the battery containment structure (200) may have a second side outer surface (221 and a second side inner surface (222) opposite the second side outer surface. The second side may also have a lip (226) extending from the second side inner surface along at least a portion of the second side bottom edge (223).

As shown in FIG. 2 the plurality of first bearings (250) may be connected to the first side outer surface (211). Similarly, the plurality of second bearings (260) may be connected to the second side outer surface (221). The connection between the bearing(s) and the outer surface(s) is preferably a fastened attachment in which a fastener such as a bolt (with or without a nut), a screw, a rivet, or the like passes through the central axis of the bearing and into or through a respective side of the battery containment structure (200).

In some embodiments, the bearings (first bearings and/or second bearings) may be replaced by one or more slide plates. When used, the slide plates may be sized and shaped to fit within the respective first track and/or second track. That is to say that the slide plates will have an external cross sectional profile which is similar to that of an internal cross sectional profile of the respective track, and a size which is slightly smaller than the respective track in height and width dimension(s). By slightly smaller it is meant that each dimension of the slide plate is no more than 1 cm less than the corresponding dimension of the track with no more than 0.5 cm less than the corresponding dimension of the track being more preferred, and no more than 0.1 cm less than the corresponding dimension of the track being most preferred. The slide plate(s) will preferably be made of a low friction material. Examples of such low friction materials including ultra high molecular weight polyethylene (UHMW) plastics, bronze, powdered metal, and Teflon®. The slide plate(s), when used may be connected to the battery containment structure using similar connection mechanisms to that of the bearings, including fasteners such as a bolt, a screw, a rivet, or the like.

The lower cross-member (230) may extend between the first side inner surface (211) at a first side lower corner (215) and the second side inner surface (221) at a second side lower corner (225) as shown in FIG. 1 to FIG. 2. Similarly, the upper cross-member (240) may extend between the first side inner surface along a first side top edge (214) and the second side inner surface along a second side top edge (224).

The apparatus (10) for removing and installing the battery for an electrically driven vehicle may also comprise a linear motion device (300). The linear motion device may be selected from the group consisting of a winch, a hydraulic actuator, a pneumatic actuator, an electric actuator, a gear and chain drive, a belt and pulley drive, and a screw drive. The preferred linear motion device is a winch.

The linear motion device (300) may have a linear motion distance. As used herein and in the claims—the term linear motion distance refers to the distance which the linear motion device travels between a fully extended position (i.e.—with the battery containment structure in a lowered position as shown in FIG. 6) and a full retracted position (i.e.—with the battery containment structure in a fully raised position as shown in FIG. 7). In practice, it is preferred that the first track length (112), the second track length (122), and the linear motion distance are substantially equal to or equal to one another. However, embodiments, may exist in which the first track length and/or the second track length are greater than or less than the linear motion distance.

The linear motion device (300) may be electrically connected to, and thereby activated by a power source. In some embodiments the power source may be the battery (20). In other embodiments, the power source may be a secondary power source, such as a second battery. The second battery may be a 12 volt, 12 amp battery of the lead acid variety. However, the second battery could also be of lithium ion or other varieties. In some embodiments, the secondary power source may be electrically connected to the battery to receive an electrical charge from the battery.

Figure 3A:
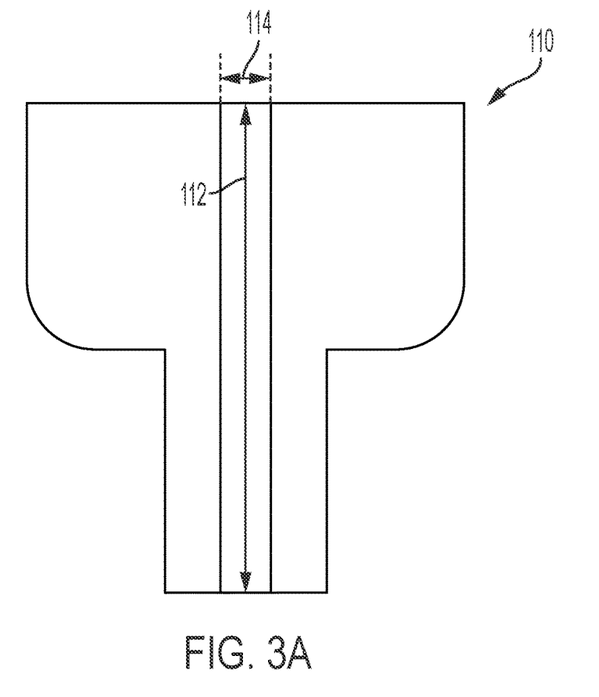
FIG. 3A depicts a side view of a first track for an apparatus for removing and installing a battery in an electrically driven vehicle.
Figure 3B:
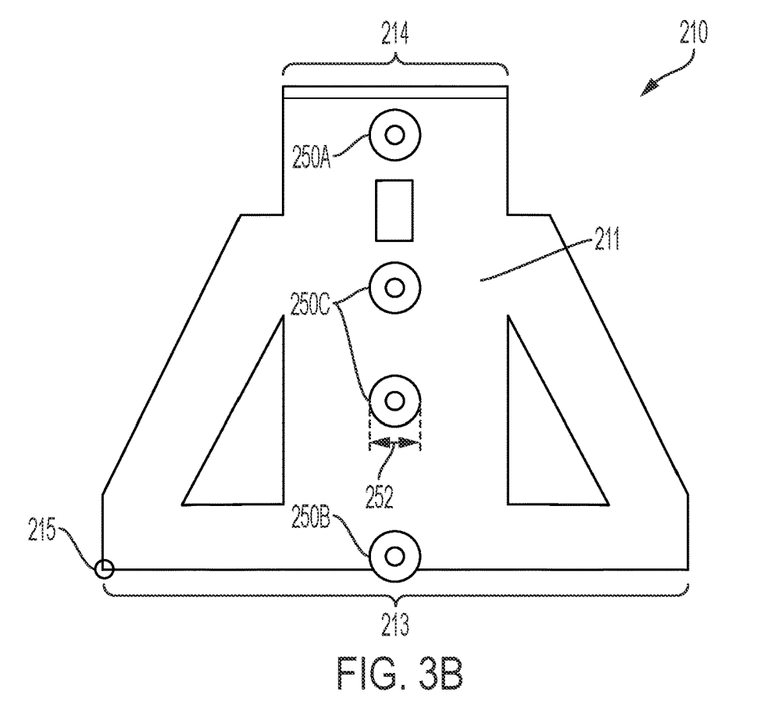
FIG. 3B depicts a side view of a battery containment structure for an apparatus for removing and installing a battery in an electrically driven vehicle.

FIG. 3A and FIG. 3B show front views of the first track (110) and the first side outer surface (211) respectively. As shown in FIG. 3A, the first track will have a first track length (112) and a first track width (114). When installed in the chassis (40), the first track length will be measured in a plane substantially parallel with the force of gravity while the first track width will be measured in a plane substantially perpendicular with the first track length.

As shown in FIG. 3B, the plurality of first bearings (250) may be arranged in at least a first column along the first side outer surface (211). That is to say that each of the first bearings is connected to the first side outer surface in a linear arrangement running parallel to a length dimension of the first side. The connection between the first bearing(s) and the first side outer surface can take many forms, including a bolt (with or without a nut), a screw, a rivet, a stud and clip, and combinations thereof.

FIG. 3B also shows the first bearings (250) having a first bearing diameter (252). In practice, the first bearing diameter is preferably substantially similar to the first track width (114). This allows the first bearings to enter and move along the first track (110) while also reducing rocking of the first bearings within the first track during operation. By substantially similar it is meant that the first bearing diameter is equal to or slightly smaller than the first track width. By slightly smaller than the first track width, it is meant that the first bearing diameter is in a range selected from the group consisting of between 0.1 mm and 1 cm less than the first track width, between 0.1 mm and 5 mm less than the first track width, between 0.1 mm and 1 mm less than the first track width, between 1 mm and 1 cm less than the first track width, between 1 mm and 5 mm less than the first track width, and between 5 mm and 1 cm less than the first track width.

The number of first bearings in the plurality of first bearings (250) is not considered important, and may be selected from the group consisting of between 1 and 50, between 1 and 25, between 1 and 10, and between 1 and 5. As shown in FIG. 3B, in embodiments having two or more first bearings, the plurality of first bearings comprises a first top bearing (250A) and a first bottom bearing (250B). The first top bearing may be connected to the first side outer surface along the first side top edge (214) while the first bottom bearing may be connected to the first side outer surface (211) along the first side bottom edge (213). In embodiments having three or more first bearings, the plurality of first bearings may further comprise at least one first central bearing (250C). The at least one first central bearing may be connected to the first side outer surface at a location between the first top bearing and the first bottom bearing.

Figure 4A:
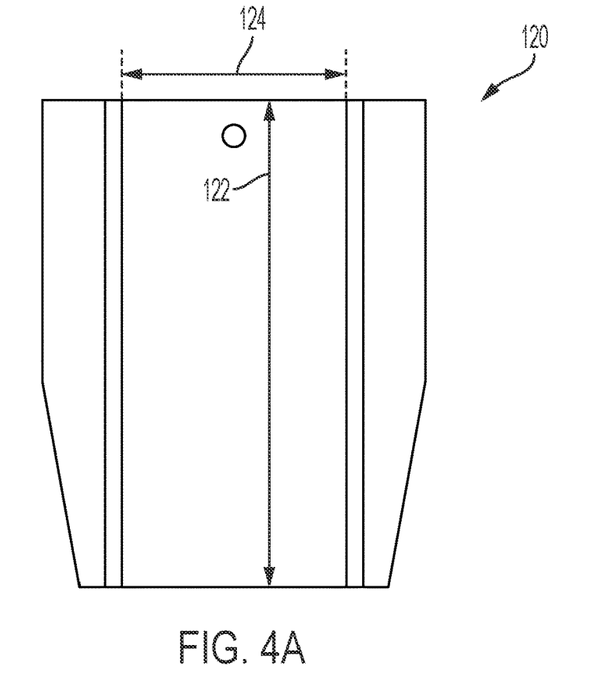
FIG. 4A depicts a side view of a second track for an apparatus for removing and installing a battery in an electrically driven vehicle.
Figure 4B:
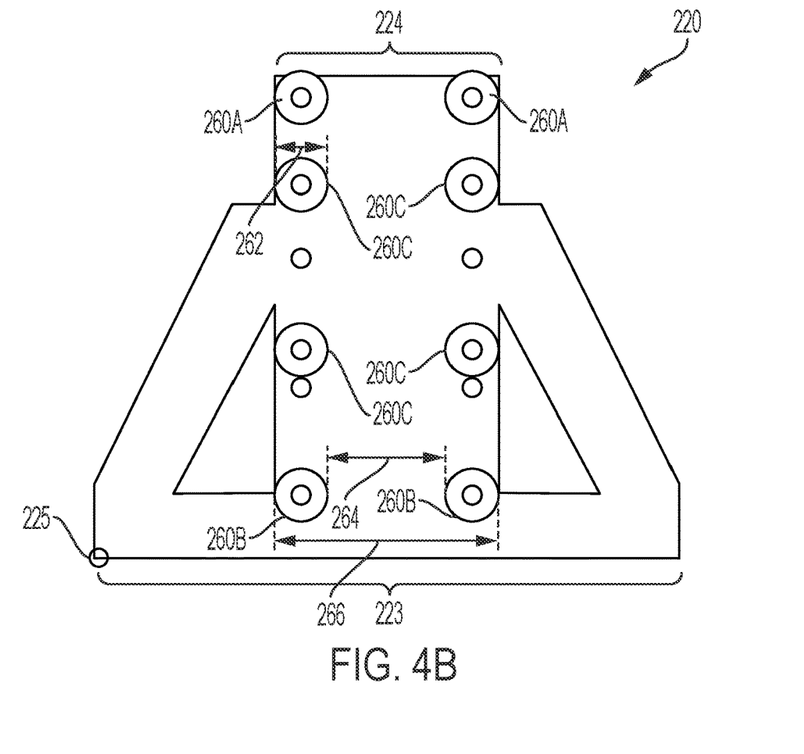
FIG. 4B depicts a side view of a battery containment structure for an apparatus for removing and installing a battery in an electrically driven vehicle.

FIG. 4A and FIG. 4B show front views of the second track (120) and the second side outer surface (221) respectively. As shown in FIG. 4A, the second track will have a second track length (122) and a second track width (124). When installed in the chassis, the second track length will be measured in a plane substantially parallel with the force of gravity while the second track width will be measured in a plane substantially perpendicular with the second track length.

As shown in FIG. 4B, the plurality of second bearings (260) may be arranged in at least one column along the second side outer surface (221). However, in preferred embodiments, the plurality of second bearings are arranged in two columns along the second side outer surface. Each column of second bearings is connected to the second side outer surface in a linear arrangement running parallel to a length dimension of the second side. The connection between the second bearing(s) and the second side outer surface can take many forms, including a bolt (with or without a nut), a screw, a rivet, a stud and clip, and combinations thereof.

In embodiments where the second bearings (260) are arranged in two columns along the second side outer surface (221), the plurality of second bearings can be thought of as belonging to two subsets. A first subset of the plurality of second bearings may be arranged in at least a second column along the second side outer surface, while a second subset of the plurality of second bearings may be arranged in at least a third column along the second side outer surface.

FIG. 4B shows the two columns of second bearings (260) comprising a plurality of rows, each row comprising two of the second bearings with each row of second bearings connected to the second side outer surface (221) in a linear arrangement running parallel to a width dimension of the second side. While each second bearing within an individual row preferably has an identical second bearing diameter (262), it is not considered necessary for each second bearing within an individual row to have identical second bearing diameters. In some embodiments, one second bearing within a row may have a second bearing diameter which is smaller than its corresponding second bearing in the same row.

In embodiments where the second bearings (260) are arranged in two columns along the second side outer surface (221), there will be a bearing span (266). The bearing span refers to the sum of two of the second bearing diameters (262) within an individual row and the gap distance (264) between the outer edge of the two second bearings in said row.

In practice, the bearing span (266) is preferably substantially similar to the second track width (124). This allows the second bearings (260) to enter and move along the second track (120) while also reducing rocking of the second bearings within the second track during operation. By substantially similar it is meant that the bearing span is equal to or slightly smaller than the second track width (124). By slightly smaller than the second track width, it is meant that the bearing span is in a range selected from the group consisting of between 0.1 mm and 1 cm less than the second track width, between 0.1 mm and 5 mm less than the second track width, between 0.1 mm and 1 mm less than the second track width, between 1 mm and 1 cm less than the second track width, between 1 mm and 5 mm less than the second track width, and between 5 mm and 1 cm less than the second track width.

The number of second bearings of the plurality of second bearings (260) in each column is not considered important, and may be selected from the group consisting of between 1 and 50, between 1 and 25, between 1 and 10, and between 1 and 5. As shown in FIG. 4B, in embodiments having two or more second bearings in each column, the plurality of second bearings may comprise two second top bearings (260A)—one in each column—and two second bottom bearings (260B)—one in each column. Each of the two second top bearings may be connected to the second side outer surface (221) along the second side top edge (224) while each of the two second bottom bearings may be connected to the second side outer surface along the second side bottom edge (223). In embodiments having three or more second bearings in each column, the plurality of second bearings may further comprise at least two second central bearings (260C). At least one of the two second central bearings may be connected to the second side outer surface between a first of the two second top bearings and a first of the two second bottom bearings, while at least one other of the two second central bearings may be connected to the second side outer surface between a second of the two second top bearings and a second of the two second bottom bearings.

While FIG. 3A, FIG. 3B, FIG. 4A, and FIG. 4B show the bearings in an arrangement where the first bearings (250) are in a single column and the second bearings (260) are in a two column arrangement—different configurations may exist. For example, in some instances, the first bearings and the second bearings may both be in a two column arrangement. In other instances the first bearings may be in a two column arrangement while the second bearings are in a single column arrangement. In still other embodiments the first bearings and the second bearings may both be in a single column arrangement.

In use, the plurality of first bearings (250) will be disposed within the first track (110). This allows the first bearings to move linearly along the first track when the battery containment structure (200) is acted on by a force applied by the linear motion device (300). Similarly, the plurality of second bearings (260) will be disposed within the second track (120). This allows the second bearings to move linearly along the second track when the battery containment structure is acted on by a force applied by the linear motion device.

FIG. 5 to FIG. 7 depict the various steps for installing a battery (20) into an electrically driven vehicle (30). In the embodiments shown in FIG. 5 to FIG. 7—the electrically driven vehicle is an all-terrain vehicle (ATV) as shown in FIG. 10. However, the apparatus (10) is not limited to use in all-terrain vehicles and has applications in a variety of other vehicles including utility terrain vehicles (UTV), cars, trucks, sport utility vehicles (SUV), motorcycles, and tricycles.

As shown in FIG. 5, the method for installing a battery (20) into an electrically driven vehicle (30) begins by at least partially—and preferably fully—extending the linear motion device (300) which is connected to the upper cross member (240) of the battery containment structure (200). In FIG. 5, the linear motion device is shown more than fully extended to better illustrate the battery containment structure, chassis (40), and tracks (110/120). In practice, a fully extended linear motion device is one in which the battery containment device has been lowered to ground level with the bottom surface of the battery containment device touching the ground.

For new battery installations, the battery containment structure may not contain a battery during this step. For battery replacements, the battery containment structure may contain a partially or fully discharged battery, which is then disconnected from the electrically driven vehicle's control system, and removed from the battery containment structure.

FIG. 6 shows the next step in the method for installing a battery (20) into an electrically driven vehicle (30), which may comprise inserting the battery into the battery containment structure (200). In this regard, the battery containment structure is configured to receive and hold the battery between the first side inner surface (212) and the second side inner surface (222). By this it is meant that the battery containment structure is of sufficient dimensions, and is made of a material of sufficient durability, to receive and hold the battery during operation of the electrically driven vehicle.

In some embodiments, the battery (20) may be contained within a housing (22) as shown in FIG. 5 to FIG. 7. It is preferred, but not considered necessary, that the housing (or the battery in embodiments where the battery is not contained within a housing) comprise a plurality of devices connected to a bottom surface of the housing. The plurality of devices may be selected from the group consisting of at least one wheel, at least one caster (24), and combinations thereof. This allows the battery/housing to roll across a surface for easy installation to and removal from the battery containment structure (200).

FIG. 7 shows the next step in the method for installing a battery (20) into an electrically driven vehicle (30), which may comprise retracting the linear motion device (300). By retracting the linear motion device, the linear motion device lifts the battery containment structure (200) containing the battery into the chassis (40) while the plurality of first bearings (250) advance at least partially through the first track (110) and the plurality of second bearings (260) advance at least partially through the second track (120).

The method as shown in FIG. 5 to FIG. 7 may be reversed in order to remove the battery (20) from the electrically driven vehicle (30). Such a method would begin by extending the linear motion device (300). By extending the linear motion device, the linear motion device lowers the battery containment structure (200) containing the battery to ground level while the plurality of first bearings (250) advance at least partially through the first track (110) and the plurality of second bearings (260) advance at least partially through the second track (120). Next, the battery is disconnected from the electrically driven vehicle's control system, and removed from the battery containment structure.

Figure 8:
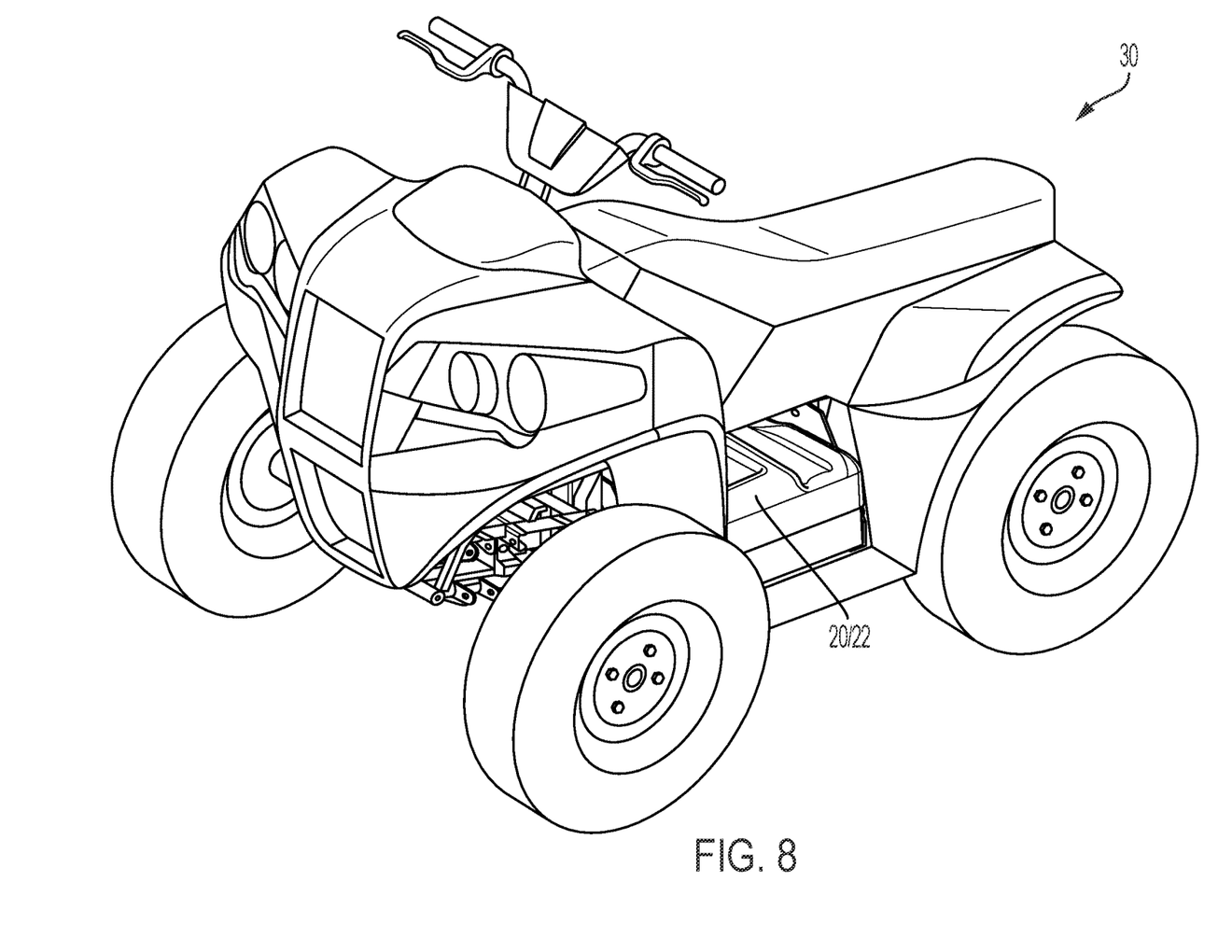
FIG. 8 depicts an assembled view of an electrically driven vehicle with an apparatus for removing and installing a battery in the electrically driven vehicle.

FIG. 8 shows an embodiment of the battery (20) installed in an electrically driven vehicle (30). As shown in FIG. 8, the electrically driven vehicle is an all-terrain vehicle (ATV). However, the apparatus and method may be equally useful for removing and installing a battery in other electrically driven vehicles such as utility terrain vehicles (UTV), cars, trucks, sport utility vehicles (SUV), motorcycles, and tricycles.

The battery (20) for an electrically driven vehicle may be electrically connected to the vehicle's control unit so that an electric current from the battery is transferred to an electric motor (not shown) when the vehicle's throttle is activated. The electric motor then converts the electric current from electrical energy to rotational energy, and transfers that rotational energy to the electrically driven vehicle's drivetrain. In some embodiments, the electric current from the battery may also be used to power other electrical devices contained on the electrically driven vehicle such as lights, horns, sirens, gauges, and the like (not shown).

The preferred battery is a 72 volt 100 amp lithium style battery. The lithium style battery may be a lithium ion battery, a lithium polymer battery, or a lithium prismatic battery.

The apparatus and method disclosed herein allows an electric vehicle operator to quickly and easily lower the electric vehicle battery to ground level without requiring the operator to lift the heavy battery or contort their body underneath the vehicle. Once lowered to ground level, the operator can easily remove a partially or fully discharged battery, replace it with a charged battery, and position the battery back in the vehicle—again without the operator having to lift the heavy battery or contort their body underneath the vehicle. In this manner, an electric vehicle can receive a fresh, fully charged battery that is ready for operation without having to wait for a charging station to recharge the electric vehicle's battery.

What is claimed is:

1. An apparatus for removing and installing a battery for an electrically driven vehicle comprising:
    a guide system comprising:
        a first track attached to a first location on a chassis of the electrically driven vehicle, said first track having a first track length and a first track width, and
        a second track attached to a second location on the chassis of the electrically driven vehicle, said second track having a second track length and a second track width;
    a battery containment structure comprising:
        a first side having a first side outer surface, a first side inner surface opposite the first side outer surface, and a first lip extending from the first side inner surface along at least a portion of a first side bottom edge,
        a second side having a second side outer surface, a second side inner surface opposite the second side outer surface, and a second lip extending from the second side inner surface along at least a portion of a second side bottom edge,
        a lower cross-member extending between the first side inner surface at a first side lower corner and the second side inner surface at a second side lower corner,
        an upper cross-member extending between the first side inner surface along a first side top edge and the second side inner surface along a second side top edge,
        a plurality of first bearings connected to the first side outer surface, and
        a plurality of second bearings connected to the second side outer surface; and
    a linear motion device attached to a third location on the chassis of the electrically driven vehicle, said linear motion device having a linear motion distance; and
    wherein
        the first track length and the second track length are each oriented substantially perpendicular to a force of gravity;
        the battery containment structure is configured to receive and hold the battery between the first side inner surface and the second side inner surface;
        the plurality of first bearings are arranged in at least a first column along the first side outer surface;
        a first subset of the plurality of second bearings are arranged in at least a second column along the second side outer surface;
        a second subset of the plurality of second bearings are arranged in at least a third column along the second side outer surface;
        each of the first bearings has a first bearing diameter which is substantially similar to the first track width;
        the plurality of first bearings are disposed within the first track;
        the plurality of second bearings are disposed within the second track;
        the linear motion device is connected to the upper cross-member; and
        the first track length, the second track length, and the linear motion distance are substantially equal to one another.

2. The apparatus of claim 1, wherein the plurality of first bearings comprises a first top bearing and a first bottom bearing wherein the first top bearing is connected to the first side outer surface along the first side top edge, and the first bottom bearing is connected to the first side outer surface along the first side bottom edge.

3. The apparatus of claim 1, wherein the plurality of second bearings comprises two second top bearings and two second bottom bearings wherein the two second top bearings are connected to the second side outer surface along the second side top edge, and the two second bottom bearings are connected to the second side outer surface along the second side bottom edge.

4. The apparatus of claim 1, wherein the linear motion device is selected from the group consisting of a winch, a hydraulic actuator, a pneumatic actuator, an electric actuator, a gear and chain drive, a belt and pulley drive, and a screw drive.

5. The apparatus of claim 4, wherein the linear motion device is activated by a power source.

6. The apparatus of claim 5, wherein the power source is the battery.

7. The apparatus of claim 5, wherein the power source is a secondary power source.

8. The apparatus of claim 1, further comprising the battery.

9. The apparatus of claim 8, wherein the battery is contained within a housing.

10. The apparatus of claim 9, wherein the housing comprises a plurality of devices connected to a bottom surface of the housing wherein the plurality of devices is selected from the group consisting of at least one wheel, at least one caster, and combinations thereof.

11. The apparatus of claim 1, wherein the electrically driven vehicle is an all-terrain vehicle (ATV).

12. A method of installing a battery into an electrically driven vehicle using the apparatus of claim 1 comprising the steps of:
   a. inserting the battery into the battery containment structure, and
   b. applying a first linear force to the battery containment structure using the linear motion device to lift the battery containment structure into the electrically driven vehicle chassis;
   wherein, during the step of applying a linear force to the battery containment structure, the plurality of first bearings moves linearly along the first track, and the plurality of second bearings moves linearly along the second track.

13. The method of claim 12, further comprising the step of:
   c. electrically connecting the battery to the electrically driven vehicle's control system.

14. The method of claim 12, wherein prior to the step of inserting the battery into the battery containment structure, the battery containment structure contains a partially or fully discharged battery electrically connected to the electrically driven vehicle's control system, and the method further comprises the steps of:
   d. applying a second linear force to the battery containment structure containing the partially or fully discharged battery using the linear motion device to lower the battery containment structure from the electrically driven vehicle chassis to the ground;
   e. disconnecting the partially or fully discharged battery from the electrically driven vehicle's control system; and
   f. removing the partially or fully discharged battery from the battery containment structure; and
   wherein steps d, e, and f occur prior to step a.

15. An apparatus for removing and installing a battery for an electrically driven vehicle comprising:
   a guide system comprising:
      a first track attached to a first location on a chassis of the electrically driven vehicle, said first track having a first track length and a first track width, and
      a second track attached to a second location on the chassis of the electrically driven vehicle, said second track having a second track length and a second track width,
   a battery containment structure comprising:
      a first side having a first side outer surface, a first side inner surface opposite the first side outer surface, and a first lip extending from the first side inner surface along at least a portion of a first side bottom edge,
      a second side having a second side outer surface, a second side inner surface opposite the second side outer surface, and a second lip extending from the second side inner surface along at least a portion of a second side bottom edge,
      a lower cross-member extending between the first side inner surface at a first side lower corner and the second side inner surface at a second side lower corner,
      an upper cross-member extending between the first side inner surface along a first side top edge and the second side inner surface along a second side top edge,
      at least one first slide plate connected to the first side outer surface, and
      at least one second slide plate connected to the second side outer surface; and
   a linear motion device attached to a third location on the chassis of the electrically driven vehicle, said linear motion device having a linear motion distance; and
   wherein
      the first track length and the second track length are each oriented substantially perpendicular to a force of gravity;
      the battery containment structure is configured to receive and hold the battery between the first side inner surface and the second side inner surface;
      the at least one first slide plate is sized and shaped to fit within the first track;
      the at least one second slide plate is sized and shaped to fit within the second track;
      each of the at least one first slide plate and the at least one second slide plate independently comprises a low friction material selected from the group consisting of ultra high molecular weight polyethylene (UHMW) plastics, bronze, powdered metal, and Teflon®;
      the linear motion device is connected to the upper cross-member; and
      the first track length, the second track length, and the linear motion distance are substantially equal to one another.

16. The apparatus of claim 15, wherein the linear motion device is selected from the group consisting of a winch, a hydraulic actuator, a pneumatic actuator, an electric actuator, a gear and chain drive, a belt and pulley drive, and a screw drive.

17. The apparatus of claim 16, wherein the linear motion device is activated by a power source.

18. The apparatus of claim 17, wherein the power source is the battery.

19. The apparatus of claim 1, wherein the battery is contained within a housing.

20. The apparatus of claim 19, wherein the housing comprises a plurality of devices connected to a bottom surface of the housing wherein the plurality of devices is selected from the group consisting of at least one wheel, at least one caster, and combinations thereof.

* * * * *